United States Patent [19]

Argoud et al.

[11] Patent Number: 4,586,487

[45] Date of Patent: May 6, 1986

[54] PROTECTIVE TELESCOPING SHIELD FOR SOLAR CONCENTRATOR

[75] Inventors: Maurice J. Argoud, Los Angeles; Walter L. Walker, Duarte; Lloyd V. Butler, El Monte, all of Calif.

[73] Assignee: The United States of America as represented by the Administrator of the National Aeronautics and Space Administration, Washington, D.C.

[21] Appl. No.: 582,495

[22] Filed: Feb. 22, 1984

[51] Int. Cl.[4] .............................................. F24J 2/46
[52] U.S. Cl. .................................... 126/418; 126/419; 126/438
[58] Field of Search ............... 126/418, 419, 422, 438, 126/451, 440, 424, 425; 362/277-279; 49/31

[56] References Cited

U.S. PATENT DOCUMENTS

| 1,222,013 | 4/1917 | Michelson | 362/277 |
|---|---|---|---|
| 1,769,781 | 7/1930 | Harrison | 362/278 |
| 2,259,902 | 10/1941 | McCain | 126/440 |
| 3,105,486 | 10/1963 | Glenn | 126/438 |
| 4,192,292 | 3/1980 | Root | 126/419 |
| 4,220,141 | 9/1980 | Way, Jr. | 126/451 |
| 4,222,367 | 9/1980 | Jubb | 126/419 |
| 4,236,383 | 12/1980 | Frosch et al. | 126/419 |
| 4,335,578 | 6/1982 | Osborn et al. | 126/418 |
| 4,433,672 | 2/1984 | Hale et al. | 126/419 |
| 4,449,514 | 5/1984 | Selcuk | 126/440 |

Primary Examiner—James C. Yeung
Attorney, Agent, or Firm—Paul F. McCaul; John R. Manning; Thomas H. Jones

[57] ABSTRACT

Apparatus is described for use with a solar concentrator such as a parabolic dish (12, FIG. 2) which concentrates sunlight onto the small opening (18) of a solar receiver (16), for protecting the receiver in the event of a system failure that could cause concentrated sunlight to damage the receiver. The protective apparatus includes a structure which can be moved from a stowed position (30) where it does not block sunlight, to a deployed position (30A) wherein it forms a tube which substantially completely surrounds an axis (26) connecting the receiver opening to the center of the concentrator at locations between the receiver and the concentrator.

7 Claims, 5 Drawing Figures

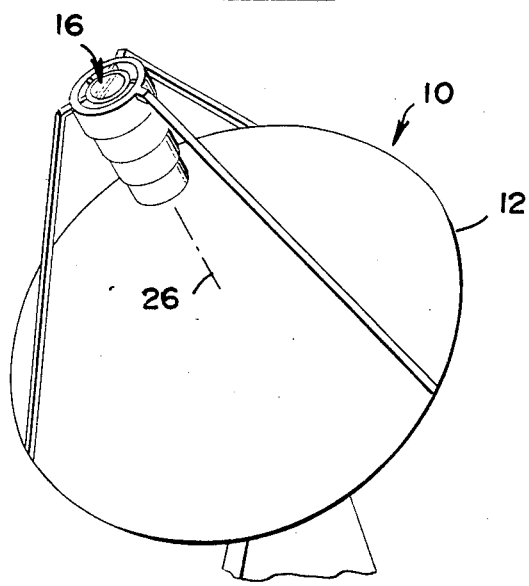
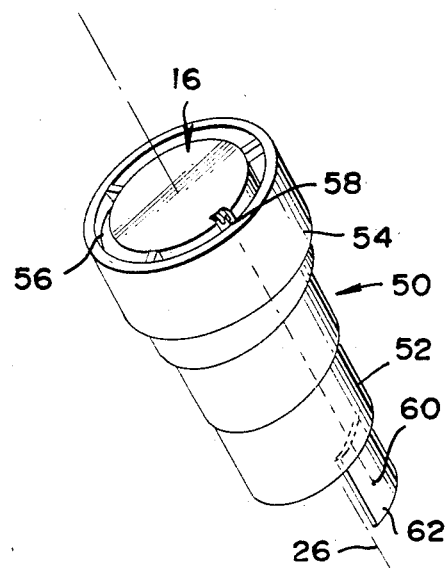
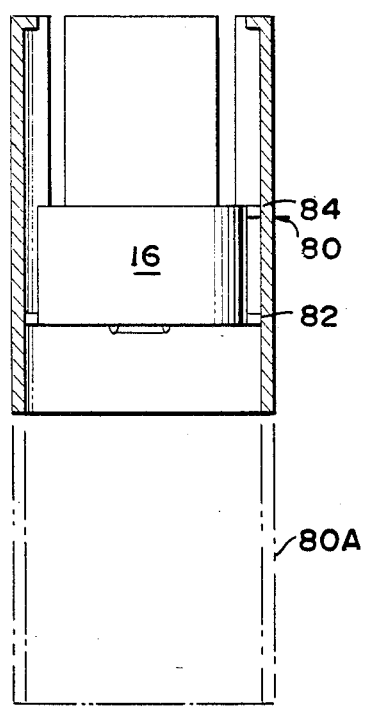
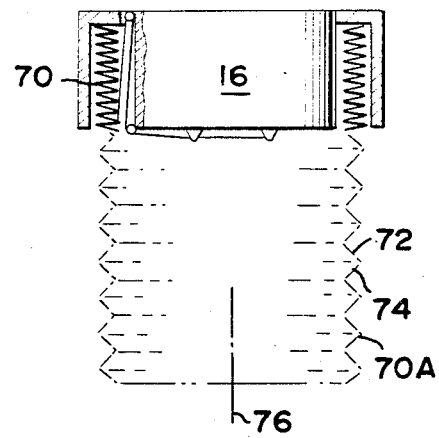

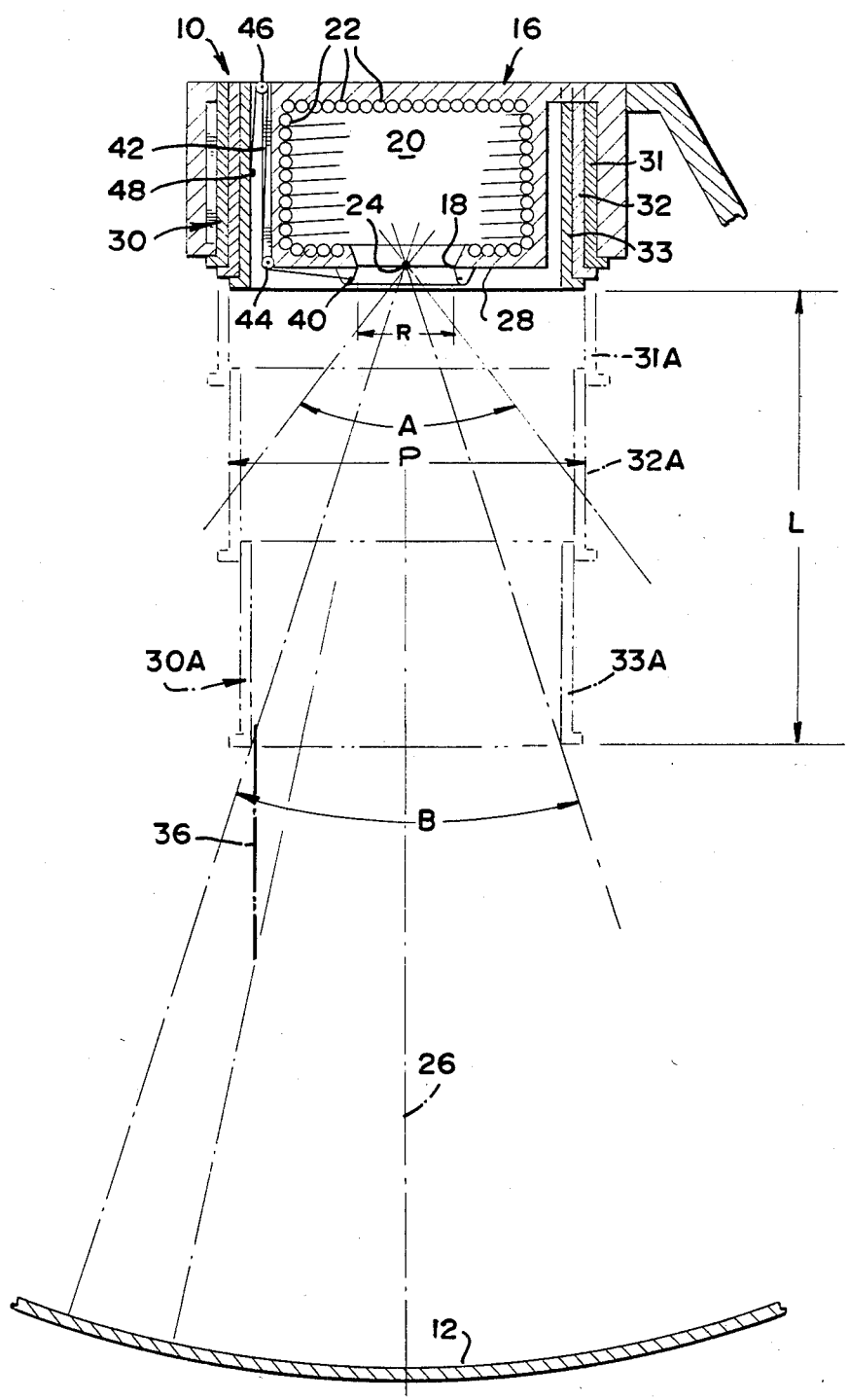

PROTECTIVE TELESCOPING SHIELD FOR SOLAR CONCENTRATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

One type of solar collector includes a concentrator, such as a parabolic dish reflector, which forms a concentrated image of the sun onto the opening of a receiver. The concentrated solar radiation heats tubes within the receiver chamber that carry water or other working fluid. If the concentrated image of the sun strikes the receiver face plate due to a tracking failure, then the face plate may be burned. Similarly, if working fluid in the receiver tubes is lost or stops circulating, the tubes can be damaged from over-heating.

Devices have been suggested for closing the receiver opening, such as a cover that normally lies beside the receiver and which is slid or otherwise moved over the receiver opening. However, concentrated sunlight may damage the cover. It is possible to use a large cover plate and a mechanism for moving the cover plate far in front of the receiver opening, so that only diffused sunlight is encountered by the cover plate. However, mechanisms for storing such a cover plate out of the way and for moving it far in front of the receiver are cumbersome. A simple and inexpensive apparatus for blocking sunlight, with only diffused sunlight falling on the blocking apparatus, would be of considerable value in protecting solar concentrator systems.

SUMMARY OF THE INVENTION

In accordance with one embodiment of the present invention, a simple apparatus is provided for protecting the receiver of a solar concentrator system. The apparatus includes a tube-like structure which can be deployed from a stowed position where it lies out of the path of sunlight directed by the concentrator to the receiver, to a deployed position wherein the structure forms substantially a tube lying forward of the receiver and substantially completely surrounding the axis which connects the center of the receiver to the center of the concentrator. The structure is moved primarily parallel to the axis of the receiver, to avoid the need for a mechanism for moving the protective structure sidewardly.

One protective system includes a group of telescoping tubes in the form of a collapsable camping cup. Another apparatus includes a strip of material wound in a spiral and lying around the receiver, and deployed to a position where it forms a helix, in the nature of a "Chinese yoyo". Another apparatus is in the form of a bellows. Another apparatus is a single tube.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a solar concentrator system showing a protection apparatus in a deployed position.

FIG. 2 is a partial sectional view of the apparatus of FIG. 1.

FIG. 3 is a partial perspective view of a protective apparatus constructed in accordance with another embodiment of the invention.

FIG. 4 is a partial sectional view of a protective apparatus constructed in accordance with another embodiment of the invention.

FIG. 5 is a partial sectional view of a protective apparatus constructed in accordance with another embodiment of the invention.

DESCRIPTION OF THE PREFERRED EMBODIMENTS

FIG. 1 illustrates a solar concentrator system 10 which includes a reflector dish concentrator 12 and a receiver 16. The receiver 16 (FIG. 2) has an opening 18 through which concentrated solar radiation is received in a cavity 20 to heat a group of tubes 22 through which a cooling fluid passes, as to turn such a fluid into steam for generating electrical power. The receiver is substantially centered on and faces along a receiver axis 26. The concentrator 12 converges sunlight towards a position 24 along an axis 26 that connects the center of the receiver to the center of the concentrator, the position 24 being even with the opening 18 of the receiver. If there were a large tracking error, the concentrated image of the sun at 24 would be concentrated on a face plate 28 of the receiver and burn it. If coolants stop flowing through the tubes 22, the inner walls of the receiver could be damaged.

A protective mechanism 30 is provided to safeguard the receiver face plate 28 and the inside of the receiver from damage in the event of a failure of the system. The mechanism includes a group of tubular protection portions or elements 31-33 that are initially in a stowed position shown in solid lines in FIG. 2. In the stowed position the mechanism surrounds the receiver 16, but is spaced from a sunlight passing region subtended by angle A along which sunlight converges on the receiver to avoid blocking the concentrated sunlight. When a malfunction occurs which requires blocking of sunlight from the receiver, the tubular elements or tubes telescope out to a deployed position shown at 30A, wherein the elements move to the blocking positions shown at 31A to 33A. In the blocking position the protection elements or portions, which each extend by substantially 360° around the receiver axis, form a tube lying forward of the receiver. Each element or portion such as 32A lies forward of another 31A to form an elongated tube with the tubular portions extending substantially in series.

In the example shown in FIG. 2, the concentrator dish 12 is wide enough that it concentrates light along an angle A of 76°. The three telescoping elements block all of the light except the light from the center of the concentrator along an angle B of 36°. This results in the deployed protective device 30A blocking 72% of all sunlight. An additional element indicated at 36 could by used to block all but 14% of the light. Actually, the receiver 16 and the deployed protective mechanism 30A casts a shadow at the center of the concentrator, so that only about 15 percent of the concentrated sunlight will reach the receiver when the protective device is in its deployed position 30A.

The deployed protective device at 30A, in its blocking position, intercepts only diffused (not as highly concentrated as normally at the receiver) sunlight, so that the material of the elements 31A–33A has to withstand only moderate temperatures. The most concentrated sunlight is applied to the uppermost element that intercepts sunlight, such as the element at 32A. It is preferred to place the largest-diameter elements so they lie closest to the receiver, and the smaller diameter elements such as 33A furthest from the receiver where the light that they intercept is more diffuse. Of course, the outer surfaces of the protective elements can be light reflecting, to minimize the amount of light they absorb.

A variety of mechanisms can be used to hold and release the protective apparatus 30. In one system for protecting against tracking errors, a wire 40 which melts at a moderate temperature, surrounds the receiver opening 18. The wire 40 lies within a moderate melting-temperature guide. If the image of the sun deviates from the position 24 far enough that it moves across the wire 40, it will melt the guide and then the wire and therefore break it. The wire has a portion 42 that extends around a pair of pulleys 44, 46, and which is tied at 48 to one of the protection elements 33. If the wire 40 is broken, the weight of the protective elements 33 causes them to move downwardly towards the concentrator 12, to the position shown at 30A. The receiver 16 will always lie above the concentrator 12 when the concentrator faces a bright sun. A spring (not shown) can be used to initially urge the elements in a forward direction towards the concentrator 12, to begin their movement when the line 40 breaks. Gravity moves the elements to their deployed position, since the axis 26 extends at a downward incline from the receiver to the concentrator, during operation of the system.

FIG. 3 illustrates another protection structure 50 of the "Chinese yoyo" type. The structure includes a long strip 52 of a material such as sheet steel, which is normally stored within the space between the outside of the receiver 16 and a housing 54. In the stowed position, one end 56 of the structure is fixed to the housing 54 while the other end is held at the same height as the inner end 56 by a cable 58, the cable normally being fixed to a point 60 at the outer end 62 of the structure. In the stowed position, the strip-like structure is wound into a spiral shape. When the cable 58 breaks, the strip is extended by the force of gravity so that the outer end 62 moves downward or forwardly, and the strip assumes the shape of a helix. The wound-strip structure 50 provides a very simple mechanism for protecting a receiver.

FIG. 4 illustrates another protection apparatus in the form of a bellows, shown in a stowed position at 70 and in a deployed configuration at 70A. The multiple ring-shaped elements such as 72, 74 of a bellows are pivotally connected at their ends in series so they can extend to form a long tube that is largely centered on the axis 76 of the receiver.

FIG. 5 illustrates another protection structure 80 in the form of a single tube which moves down from its stowed position to a deployed position 80A to protect the receiver 16. Forward and rearward guides 82, 84 on the receiver guide the tube in such movement. This structure has the advantage of great simplicity, but has the disadvantage that it is somewhat unwieldy.

Thus, the invention provides apparatus for use with a solar receiver for protecting it against concentrated sunlight in the event of a malfunction, which is of relatively simple construction. All of the protection structures are deployable into the shape of substantially a tube that extends substantially 360° around the axis of the receiver but which is spaced from the axis, at locations forward of the receiver, to block sunlight at the outside of the tubular structures where the sunlight is diffuse. The extendable structures are normally stored around the receiver and move forward (towards the concentrator) in the event of a failure. One structure includes telescoping tubes, another is formed of a spiral strip which extends into a helix, another is formed of a bellows which can be extended, while another is formed of a simple tube which can move along its axis. All of the tubes shown in the figures have a width such as P (FIG. 2) more than twice the width R of the receiver opening along substantially the entire length L by which the deployed tubes lie forward of the receiver. The length L of the extendable tube portion forward of the receiver is greater than the average outside diameter P of the tube and greater than twice the width R of the receiver opening. All of the tubular protective structures move substantially only along the axis 26 of the receiver between the stowed and deployed positions.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A solar heating apparatus comprising:
a reflector dish concentrator having an axis;
a solar receiver positioned along said axis to receive concentrated sunlight from said reflection dish through a receiver opening;
a protection structure having a central opening and a generally tubular body configuration with a side wall surrounding said receiver opening;
said protection structure being extendible from said receiver in the direction of said reflector dish such that the tubular body of the protection device extends into the reflected sunlight from the concentrator with a portion of the sunlight impinging on the side wall surface while sunlight is permitted to pass through the central opening from the concentrator to said central opening.

2. The apparatus described in claim 1 wherein:
said structure includes a plurality of telescoping tubes.

3. The apparatus described in claim 1 wherein:
said structure includes a plurality of ring-shaped members forming said plurality of protection portions, said ring-shaped members being pivotally connected in series to form a bellows.

4. The apparatus described in claim 1 wherein:
said structure comprises a strip of material forming substantially a spiral in said stowed position and a helix in said deployed position.

5. The apparatus described in claim 1 wherein:
said receiver opening defines an aperture of predetermined width through which it receives concentrated sunlight; and
in the extended position of said extendable portion, said extendable portion extends in front of said receiver aperture by a distance greater than twice the width of said receiver opening.

6. An improved solar concentrator system, including a receiver, and a concentrator that is larger than the receiver, with said concentrator converging sunlight toward an axis that passes through the receiver and concentrator, said improvement comprising:

means for protecting said receiver from overheating in the event of a system failure, said means being deployable from a stowed position in close juxtaposition to said receiver such that said means is positioned out of the path of sunlight that is concentrated onto said receiver from said concentrator, and a deployed position wherein said means has a tube-like configuration with a side wall which surrounds said axis and extends into the region between said receiver and said concentrator to block with said side wall the passage of concentrated sunlight from said concentrator onto said receiver.

7. The apparatus described in claim 6 wherein:

said receiver has an opening of predetermined width and said tube extends beyond said receiver opening by a distance greater than twice the width of said opening.

* * * * *